O. HENKER.
TESTING SPECTACLES.
APPLICATION FILED JULY 10, 1914.

1,165,597.

Patented Dec. 28, 1915.

Witnesses:
Paul Krüger
Fritz Sander

Inventor:
Otto Henker

UNITED STATES PATENT OFFICE.

OTTO HENKER, OF JENA, GERMANY, ASSIGNOR TO THE FIRM OF CARL ZEISS, OF JENA, GERMANY.

TESTING-SPECTACLES.

1,165,597.  Specification of Letters Patent.  Patented Dec. 28, 1915.

Application filed July 10, 1914. Serial No. 850,110.

*To all whom it may concern:*

Be it known that I, OTTO HENKER, a citizen of the German Empire, residing at Jena, Germany, have invented a new and useful Improvement in Testing-Spectacles, of which the following is a specification.

In order to make it possible to determine in a simple manner for each eye the distance of the vertex of its cornea from the vertex of the spectacle-glass belonging to it, the new testing-spectacles are fitted both at the right and at the left side with an aiming device, which fixes a sighting plane, which is perpendicular to the principal direction of vision of the patient and may be displaced parallel to this direction, the amount of such displacement being indicated on a scale. Such a device may consists of, for instance, a diopter.

Figure 1:
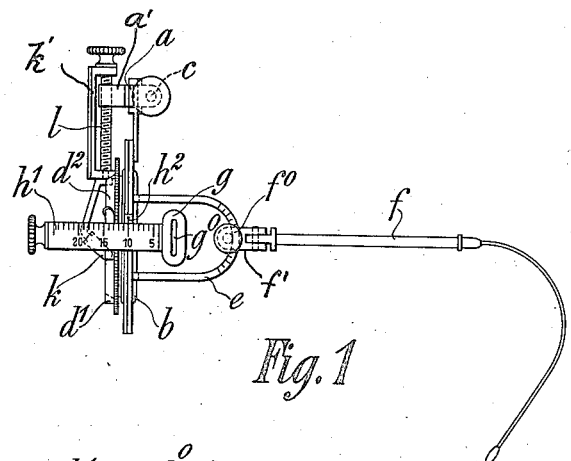
Figure 2:
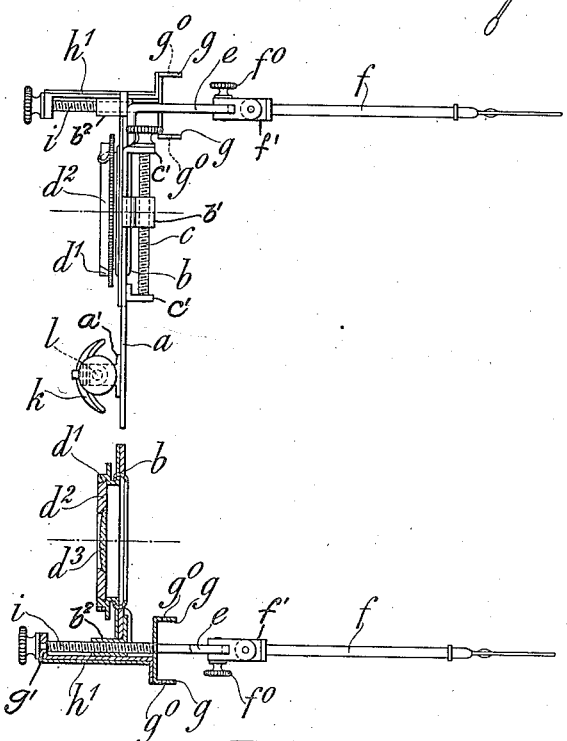

The annexed drawing shows an example of how the invention may be carried out, Figure 1 being a side elevation and Fig. 2 showing the testing-spectacles from above, partly in section.

A bridge $a$ supports at either end a test-glass carrier $b$, each of which carriers can be set laterally by means of a milled-headed screw $c$, which is journaled in brackets $c^1$ fixed to the bridge $a$ and engages a nut $b^1$ fixed to the carrier. Each of the test-glasses consists of a mount $d^1$, in which by means of a supporting ring $d^2$ the test-glass proper $d^3$ is fixed. At the temple side of each test-glass carrier $b$ a stirrup $e$ is fixed, to which a temple-wire $f$ is adjustably fitted, by being attached, so as to pivot in a plane at right angles to the stirrup, to a fitting $f^1$, which can slide around the said stirrup. A screw $f^0$ serves for clamping the fitting $f^1$ to the stirrup $e$. To the temple side of each test-glass carrier there is further fixed, so as to reach into the stirrup $e$, a diopter consisting of two plates $g$ containing parallel slots $g^0$, the plane containing the two slots (the sighting plane of the diopter) being perpendicular to the axial direction of the test-glasses. Each diopter is provided with a scale $h^1$, to which there belongs an index $h^2$ disposed on the respective test-glass carrier. For displacing each diopter parallel to the axial direction of the test-glasses a milled-headed screw $i$, which is journaled in the plate $g$ and in a bracket $g^1$ fixed to the same, engages a nut $b^2$ fixed to the part $b$. Each scale and its index is so disposed that there is directly indicated on the scale the distance, which the sighting plane of the diopter in question has from the rear vertex of the test-glass $d^3$, which lies in the same plane as the rear surface of the supporting ring $d^2$. A nose-support $k$ can be set in the vertical direction by means of a milled-headed screw $l$, which is journaled in a part $k^1$ fixed to the upper end of the nose-support $k$ and engages a nut $a^1$ fixed to the middle of the bridge $a$.

When the testing-spectacles are in use, the nose-support, the test-glass carriers and the temple-wires must be set in such a manner that each glass takes up its proper position in front of its respective eye, when the testing-spectacles rest with the nose-support on the nose and with the temple-wires on the ears of the patient. On each diopter being set for the respective eye in such a manner that its sighting plane touches the vertex of the cornea, the distance of this vertex from the rear vertex of the respective spectacle-glass can be read off directly on the corresponding scale.

I claim:

1. Testing-spectacles comprising a bridge, two aiming devices connected to the said bridge end adapted each to determine a sighting plane lying perpendicular to the principal direction of vision of the wearer of the spectacles, the said aiming devices being each displaceable parallel to the said direction, two scale-bearing parts, each scale being adapted to indicate the amount of displacement of one such aiming device, temple-wires connected to the said bridge and means for adjusting the said wires each in a vertical plane parallel to the said direction.

2. Testing-spectacles comprising a bridge, two aiming devices connected to the said bridge and adapted each to determine a sighting plane lying perpendicular to the principal direction of vision of the wearer of the spectacles, the said aiming devices being each displaceable parallel to the said direction, two scale bearing parts, each scale being adapted to indicate the amount of displacement of one such aiming device, two stirrups fixed to the spectacles, one at either end, and passing each around an aiming
5 device, two temple-wires connected to the said stirrup and adapted to be adjusted in vertical planes parallel to the said direction on the said stirrups and means for clamping each temple-wire to its stirrup.

OTTO HENKER.

Witnesses:
　PAUL KRÜGER,
　FRITZ SANDER.